(No Model.)

C. W. McLEAN.
Ground Covering for Pavements and Cellar Bottoms of Glass.

No. 240,603. Patented April 26, 1881.

Witnesses—
F. B. Townsend
W. C. Adams

Inventor—
Christopher W. McLean
per M. E. Dayton,
Attorney.

UNITED STATES PATENT OFFICE.

CHRISTOPHER W. McLEAN, OF CHICAGO, ILLINOIS.

GROUND-COVERING FOR PAVEMENTS AND CELLAR-BOTTOMS OF GLASS.

SPECIFICATION forming part of Letters Patent No. 240,603, dated April 26, 1881.

Application filed July 30, 1880. (No model.)

*To all whom it may concern:*

Be it known that I, CHRISTOPHER W. MC-LEAN, of Chicago, in the State of Illinois, have invented certain new and useful Improvements in Ground-Coverings for Pavements and Cellar-Bottoms of Glass; and I do hereby declare that the following is a full, clear, and exact description thereof, reference being had to the accompanying drawings, and to the letters of reference marked thereon, which form a part of this specification.

This invention relates to improvements in pavements; and it consists, first, in a pavement or earth covering constituted wholly or in considerable part of a strong body of glass or vitreous substance, having gravel, broken stones, or similar fragments mixed therewith or embedded in its surface; second, in the combination, with a heavy body of glass or vitreous matter having its upper surface made rough by protruding fragments or gravel, or otherwise, of a superstructure applied to the rough upper surface of the glass, and thereby held more fixedly in position on or in unitary relation with the glass substance; third, in a curb formed in vertical extension of or in the same piece with the body or base of the pavement, substantially as hereinafter set forth and claimed.

Figure 1:
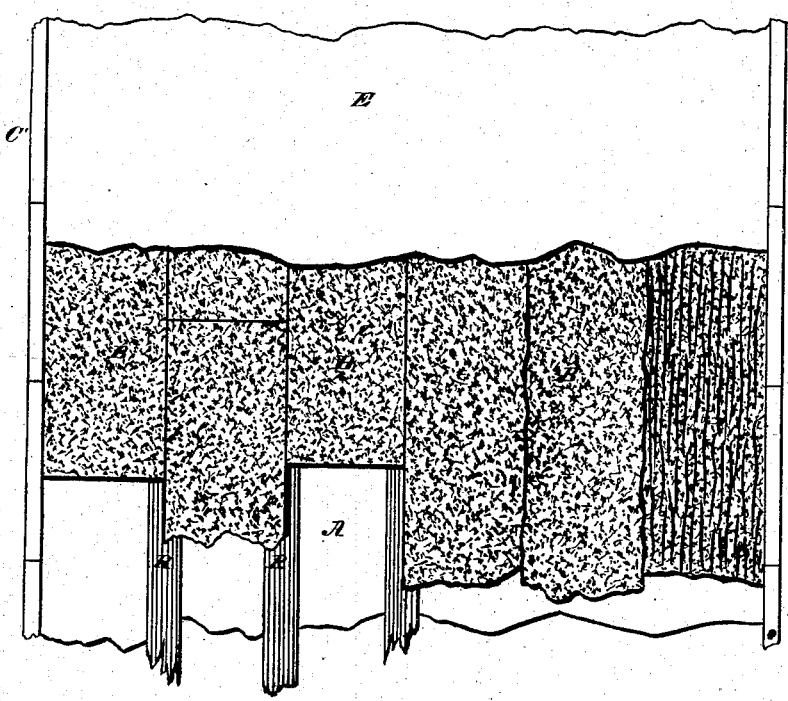
Figure 2:
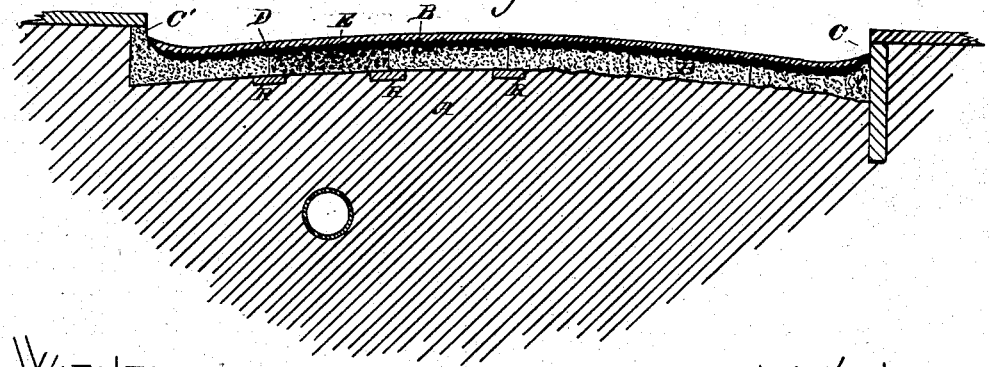

In the accompanying drawings, Figure 1 is a plan view of a street the pavement of which contains my invention. Fig. 2 is a transverse vertical section of the same through the line *x x* of Fig. 1.

A is the underlying earth of a roadway. B is a layer of vitreous substance covering the earth. C C' are the curbs. D is a body of gravel or broken stones mixed with the glass, or partially embedded in the upper surface of the glass body; and E is a superficial dressing of asphalt or other suitable material.

The vitreous body B is cheaply made of coarse ingredients, and is preferably applied in a molten or plastic state to the surface of earth, so as to conform to the inequalities of the latter, and thereby receive from the same a more uniform and perfect support. Said vitreous body is, say, three or four inches in thickness for a heavily-traveled street, but may be in any case suited in thickness to the nature and severity of the strain to which it is to be subjected.

In a street pavement the glass body B will preferably form a sub-structure or base for the support and protection of a superficial body of other material—as asphalt, cement, gravel, &c., —better suited to the purpose. For the application of some of these and other substances the upper surface of the vitreous body may be made rough, like the scratch-coat in plaster walls; but I prefer for this purpose to mix with the mass, or to embed in its surface while in a molten or plastic condition, a quantity of gravel, broken stones, or similar material. This will greatly cheapen the vitreous mass, and in the subsequent application of plastic cement or asphalt the protruding gravel or fragments become a medium of more perfect union between the glass and its covering, whereby both parts are mutually strengthened and the superficial body is given greater fixedness and durability.

I have devised a portable apparatus comprising a cupola or furnace in which the sand and other approved ingredients may be fused rapidly and in large quantity, a spreader for the distribution of the fused substance, and other appliances for giving to the latter a proper form and surface as it is applied to the top of the ground. The intention is to move the apparatus forward by means of a windlass or otherwise, and to pour the fused glass from the furnace upon the street as the apparatus advances. Said apparatus will, together with the method or process of covering the ground-surface with a fused vitreous mass, constitute the subject of a separate application for patent.

By such or similar means the ground-surface may be covered by a number of continuous strips, as illustrated in Fig. 1. Being applied in a molten state, the glass will readily flow to conform with the irregularities of the curb, or with the edge of a strip of the same material previously laid, and will also conform perfectly to the ground-surface on which it is poured. The surface of the applied mass may be leveled, and roughened or corrugated to better receive the superjacent material, by means of a roller or drag following the smelter and operating upon the glass while the latter is yet plastic.

In a street-pavement having a vitreous foundation, as described, I prefer to employ as a superficial or wearing coat some substance adapted to be applied in a plastic state, and, as already stated, to use gravel or broken fragments of stone or similar substance to give roughness to the glass surface and union to the adjacent strata. To this end I should, in applying the glass in a molten condition to the ground-surface, either mix the gravel with the glass in the smelter or pour the gravel upon the molten glass as it emerges from the smelter. I should also immediately thereafter apply the asphalt or other plastic material to the surface, and thus secure to the whole a unitary character, as previously stated. A top dressing of sand and earth may, however, be employed instead of a literally plastic substance, in which case the graveled or otherwise roughened surface of the glass bed will operate in substantially the same manner to give fixedness to the top dressing and practical unity to the whole.

Instead of applying the vitreous body B to the ground-surface in a fused condition, as described, it may sometimes be more cheaply prepared in blocks or slabs of suitable dimensions at points where the materials are conveniently available for its manufacture, and transported and laid in this form on the surface to be covered. In this case suitable cement should be used to fill the seams; and, if necessary, flags or boards R, Fig. 2, may be laid beneath the seams to add to the stability of the bed so formed.

In most instances, when the glass body is to directly receive the wear, as in the case of cellar-bottoms, the gravel or fragments of stone mixed therewith should, I think, be wholly embedded in the vitreous matter, and the sand or earth in that case should not be used in connection with the gravel in the method of forming the slabs last described.

In streets or other situations having water-pipes or other pipes laid beneath the surface, which may require to be occasionally uncovered, a series of slabs or strips of the glass should be arranged directly above such pipes, so that they may be readily removed in sections to permit the necessary excavation to be made.

In the preparation of slabs to form the body B, said slabs may be run in molds having one or both of their broad faces corrugated or indented to give the rough surface required. If gravel or stone fragments are employed to give this roughness, such gravel or fragments may be mixed with or poured upon the fused material, as already set forth, or the fused glass may be poured upon a thin layer of such gravel or fragments spread upon the bottom of the mold. In the latter case the desired prominence of the fragments in the finished slab will be secured by the presence of a quantity of sand or earth among the gravel or fragments to prevent the flow of the glass wholly about them.

Whether the body B shall be applied to the street in a fused state or in slabs previously prepared, the curb may be formed of the same material, and be made in a continuous mass with the adjacent part of the street-covering. Such a construction is shown in the sectional Fig. 2, at C'. It is evident that such a construction will, in connection with the pavement described, effect a saving in the excavation and material required for the proper setting of stone curbs, and that, forming a part of the pavement or substructure itself, such a curb will more permanently retain its proper position. Surface-water may also be thereby more perfectly conducted to the sewers.

The sanitary and economic advantages of a pavement having a foundation of glass, particularly if in a continuous body or made up of large slabs united to give a unitary character to the whole, are readily apparent. Excluding moisture from beneath, and preventing drainage through the pavement in a degree not possible in the use of other materials, it is obvious that the destructive effects of frost in cold climates will be greatly reduced, and that thereby a class of pavement-surfaces of acknowledged superiority—such as asphalt and kindred material—may in such climates be profitably used.

As a covering for floors of cellars, abattoirs, packing-houses, vaults, and similar situations, the utility of glass having gravel mixed therewith or embedded in its surface is equally clear by reason of its being impervious to fluids and gases, and impenetrable to vermin, while possessing the durability of stone. In many cases, when used as a floor-covering, it will be desirable to extend the margins upward next to the contiguous walls and pillars, as illustrated of the curb at C' Fig. 2. With the devices referred to for fusing the vitreous material on the spot it will be practicable to apply the same in a molten state to such floors, and thereby avoid the necessity of seams and cement.

In order to give greater strength to the flooring or pavement, as a whole, the glass body B may be laid on a sub-base of flagging or planks, if desired, without departure from the spirit of my invention.

Having thus described my invention, I claim—

1. The earth-covering described, consisting of a heavy body of glass or vitreous substance having gravel, broken stones, or similar small bodies in its upper surface, substantially as set forth.

2. The combination, in a pavement or earth covering, of a heavy body of glass or vitreous substance having its upper surface made rough, and a superficial body, more suitable than the glass, to receive the wear upon the pavement applied to the rough glass surface, and thereby held more permanently in place, substantially as described.

3. A pavement consisting of a body of glass having gravel or fragments of stones embedded in its surface or protruding therefrom, or having a surface otherwise made rough, as described, combined with a superjacent body of material applied in a plastic state upon said rough surface, whereby the two bodies more perfectly adhere to form a unitary mass, substantially as described.

4. The curb C', made in a continuous piece with the adjacent part of the pavement or its foundation, substantially as shown and described.

In testimony that I claim the foregoing as my invention I affix my signature in presence of two witnesses.

C. W. McLEAN.

Witnesses:
M. E. DAYTON,
JESSE COX, Jr.